H. Seehausen,
Animal Trap.
No. 99,245.      Patented Jan. 25, 1870.
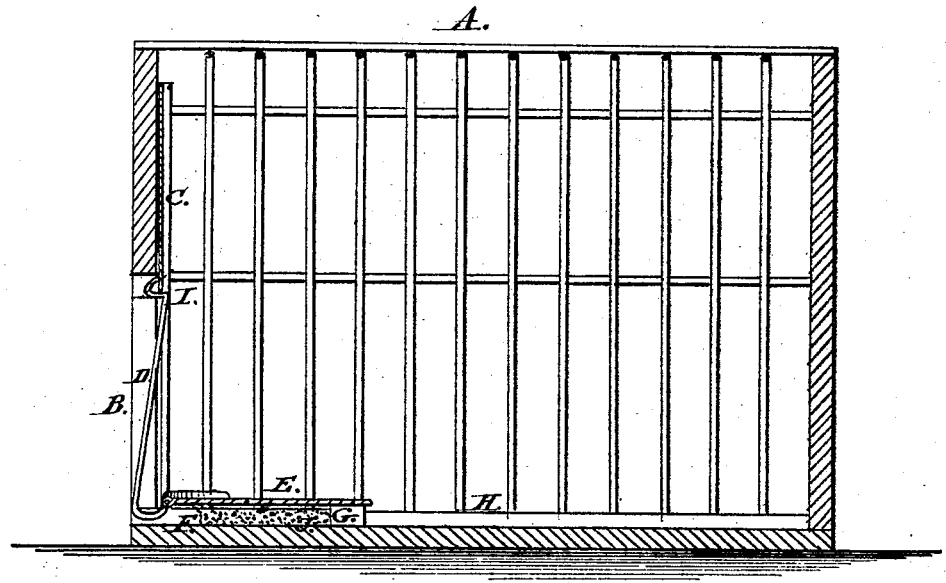
WITNESSES:
INVENTOR:

United States Patent Office.

H. SEEHAUSEN, OF MEMPHIS, TENNESSEE.

Letters Patent No. 99,245, dated January 25, 1870.

IMPROVED ANIMAL-TRAP.

The Schedule referred to in these Letters Patent and making part of the same.

*To all whom it may concern:*

Be it known that I, H. SEEHAUSEN, of Memphis, in the county of Shelby, and State of Tennessee, have invented a new and useful Improvement in Animal-Trap; and I do hereby declare that the following is a full, clear, and exact description thereof, which will enable others skilled in the art to make and use the same, reference being had to the accompanying drawings, forming part of this specification.

This invention relates to a new and useful improvement in traps for catching animals, and consists in arranging a drop door in a suitably-constructed cage or box, which door is elevated when the trap is set, and held in position by means of a rod attached to an apron, which apron is raised by the animal, and the trap sprung, as hereinafter more fully described.

The accompanying drawing represents a side view of a trap, constructed according to my invention.

A is the trap, which may be of any form or size.

On one side or end there is an opening, as seen at B.

C is a drop-door or plate, which, when down, effectually closes the opening B. It slides in grooves loosely, so that when it is unsupported, it readily falls, by its own gravity.

This door is supported in a raised position, when the trap is set, by the rod D, which is rigidly attached to the apron E, and stands at a right angle therewith, (or nearly so,) as seen in the drawing.

The apron E is hinged to a cross-pin or threshold, F, on to which the door C drops, and it rests on small blocks G, (one or more,) so that it is raised a little distance above the floor H of the trap, as seen.

Near the top of the rod D there is a bend, as seen at I, which bend forms a rest for the door, when the apron is down and the trap set, as seen in the drawing.

J represents the bait, which is placed beneath the apron.

The animal (a rat, for instance,) will go into the cage over the apron, and, in his efforts to get at the bait, he will raise the apron, which will throw the shoulder I from under the drop-door, which will fall and confine him in the cage.

A wire rod may be attached to the top of the drop-door, for raising it, or any other means may be provided for that purpose. When the door is raised, the apron will fall to a horizontal position, which will bring the support under the door again, and set the trap ready for another operation.

This a cheap, simple, and effectual arrangement for securing rats and other noxious animals.

Having thus described my invention,

I claim as new, and desire to secure by Letters Patent—

The drop-door C, rod D, and apron E, combined with the cage A, (or its equivalent,) when the same are arranged to operate substantially as and for the purposes described.

H. SEEHAUSEN.

Witnesses:
W. L. INGRAM,
S. M. WESSON.